Feb. 2, 1926.                                                1,571,178
J. P. DONOVAN
AUTOMOBILE HOIST
Filed Dec. 9, 1924        2 Sheets-Sheet 1
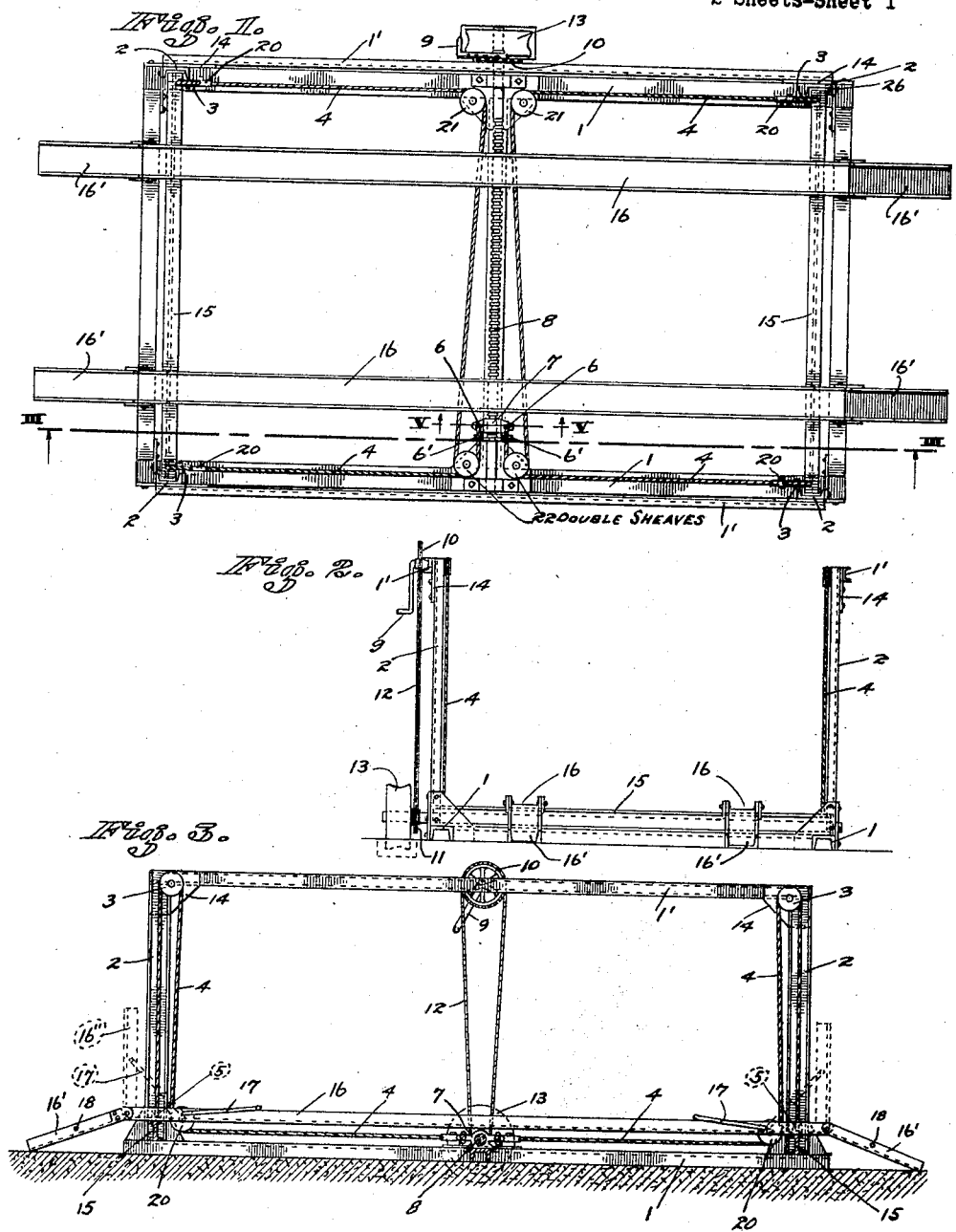
INVENTOR.
JOHN P. DONOVAN
BY
ATTORNEYS.

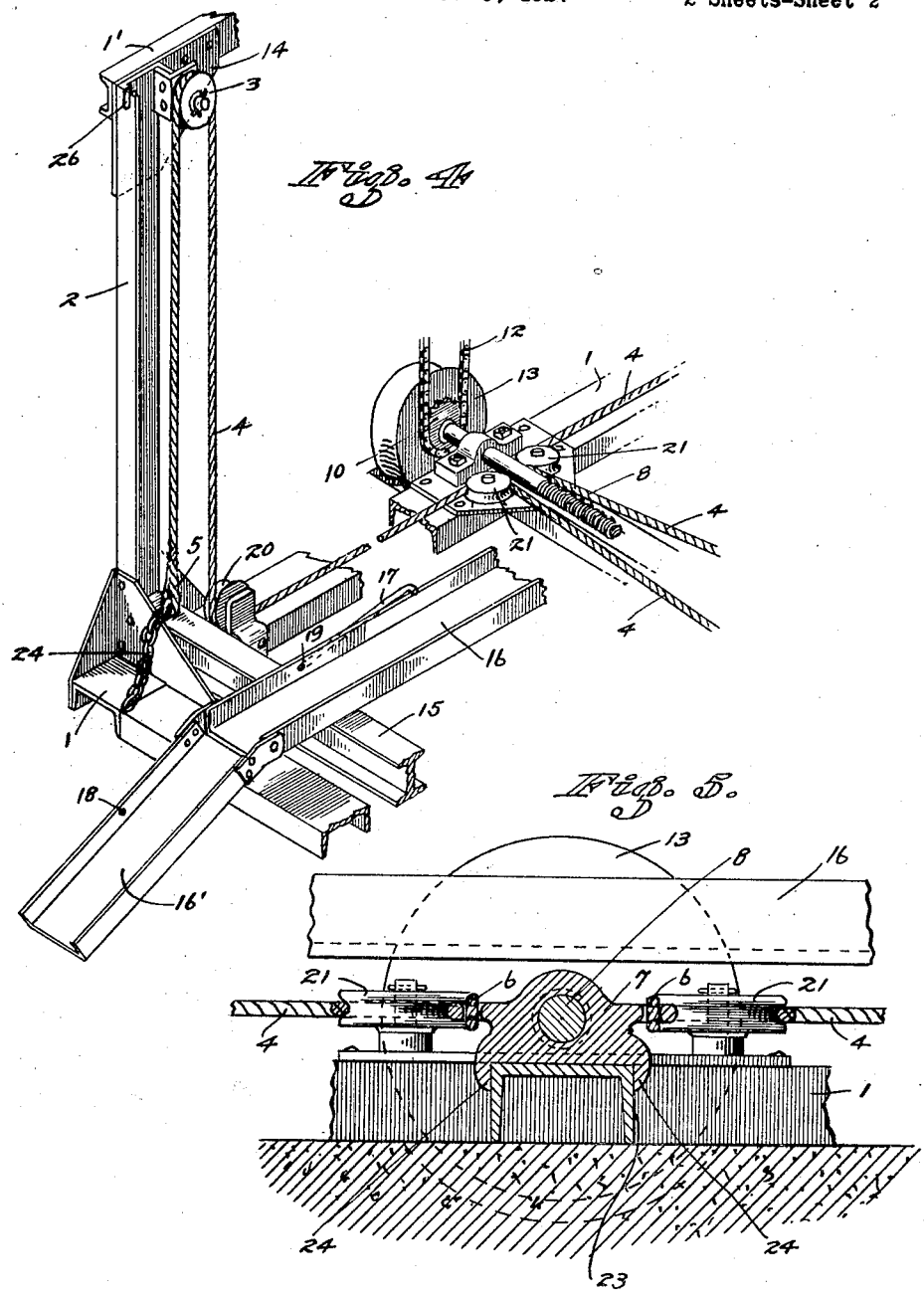

Patented Feb. 2, 1926.

1,571,178

UNITED STATES PATENT OFFICE.

JOHN P. DONOVAN, OF SAN FRANCISCO, CALIFORNIA.

AUTOMOBILE HOIST.

Application filed December 9, 1924. Serial No. 754,805.

*To all whom it may concern:*

Be it known that I, JOHN P. DONOVAN, a citizen of the United States, and a resident of San Francisco, in the county of San Francisco and State of California, have invented a new and useful Automobile Hoist, of which the following is a specification.

This invention relates to hoists as especially adapted for raising an automobile so that a workman can work thereunder and thus avoid the necessity of a pit.

The objects of the invention are to provide a hoist of this character which will be simple and cheap to manufacture, fast and effective in operation, which will be proof against falling to crush the workman, which will provide improved means to prevent the vehicle rolling or slipping off, together with other improved constructional features as will appear from the description.

In the drawings hereto:

Figure 1 is a plan view of my hoist,

Figure 2 an end view, and

Figure 3 is a sectional elevation of Figure 1 taken along the line III—III.

Figure 4 is an enlarged broken perspective of one corner of the hoist showing the cable connections and other details which are duplicated at the other corners.

Figure 5 is a still further enlarged detail in cross section taken along the line V—V of Figure 1 showing the cable connections to the traveling nut and its mounting on a transverse frame channel.

Briefly described my hoist comprises a structural steel rectangular frame 1 having four posts 2 at its corners each revolvably supporting an idler sheave 3 at its upper end with a cable 4 passing over each sheave, one end 5 of each cable being secured to the lift platform and the other ends 6 all pulled simultaneously by means of a traveling nut 7 drawn across the frame by means of a screw 8 revolved either by a hand crank 9 positioned on one side of the frame and connected by sprockets 10, 11 and chain 12 with the screw, or by means of a concave driving wheel 13 mounted directly on the shank of the screw and adapted to receive the rubber tire of another automobile so that it may be revolved by power from the latter vehicle.

The frame 1 includes two upper side members 1' extending horizontally and connected to the posts 2 by gusset plates 14 but the frame is open at both ends between the posts so that an automobile can pass straight through.

The lift platform comprises a pair of I-beams 15 extending transversely across the frame, one at each end and to which the ends 5 of the rope are secured as shown clearly in Figure 4 and a pair of wide channel iron tracks 16 extending the length of the frame and secured to the I-beams.

These channel tracks are placed with the open sides up, are spaced to the standard gauge of automobile wheels and provided at each end with a short hinged section 16' which form slanted guides from the floor to the channels so that a vehicle may be rolled up or off at either end.

When a vehicle is in place on the channel tracks these slanted ends 16' are turned upward, as indicated at 16'' in Figure 3 and hooked in place by stout iron hooks 17 engaging holes 18 in the hinged sections.

The hooks 17 are pivoted at 19 to the sides of the track channel and when not in use lie in the position shown in Figure 4.

When the four hinged ends are hooked up as explained they form an effectual barrier against the vehicle rolling off either end of the platform.

To raise the platform the ropes are led from the upper sheaves 3 over several idlers 20, 21, 22 so that all ropes lead fair to the traveling nut 7 and to which they are secured at 6 by a clip 6', the rope being continuous through the nut and leading out over the idlers to the corners of the platform.

Under the traveling nut 7 is a channel frame brace 23 extending transversely of the main frame and forming a guide for the nut, the nut being formed with side ribs 24 loosely engaging the sides of the channel so that the nut is free to travel back and forth upon the channel.

The hoist is raised by operating the hand crank 9 or power wheel 13 as described and when in elevated position the platform is locked by means of four short chains 25 each secured at one end to one end of one of the I-beams 15 and adapted at its free end to hook into a slot 26 at the top of the post by passing one of the links flatwise therein.

These chains serve two purposes, they absolutely guard against the hoist falling in case of breakage or slippage of a rope and also insure lining up of the platform in a horizontal plane in case one rope stretched a trifle, for after hooking the chain into the four slots the hoist is then lowered enough to bring the weight mostly upon the chains thus leveling the platform and relieving the cables of the load.

Instead of the chains, it is possible to use plain hooks if desired but the chain links provide for hooking at any of the links for different heights and also give the required flexibility when the hoist is again raised slightly in order to free them.

Having thus described my invention, it should be observed that I do not claim to be the inventor of a hoist of this character, but of the improved features described which all go to make it practicable for use in modern garages for working under an automobile, and when I specify a "rope" or "ropes" in the claims as the hoisting elements, it is to be understood that this is also intended to cover the use of chains if desired.

I claim:

1. An automobile hoist comprising an outer rectangular frame embracing a vertically movable platform frame, said outer frame having an elevated idler wheel at each corner with a rope passing thereover, a screw bar revolvably supported by the outer frame, a traveling nut thereon, and the rope from each corner being guided over idlers to the nut and secured thereto for simultaneously pulling thereby upon turning the screw bar, and a grooved wheel mounted upon the screw bar adapted to receive power from contact with the wheel of an automobile adjacent the hoist.

2. An automobile hoist comprising an outer rectangular frame embracing a vertically movable frame, means on the outer frame for raising and lowering the movable frame including a transverse frame member, a revolvable screw bar aligned over same and a traveling nut on the bar slidably engaging said frame member, ropes secured to the traveling nut and idlers leading the ropes to the four corners of the inner frame for raising same upon revolution of the bar.

3. An automobile hoist comprising an outer frame embracing a vertically movable frame, means on the outer frame for raising and lowering the movable frame including a transverse frame member, a revolvable screw bar aligned over same and a traveling nut on the bar slidably engaging said frame member, ropes secured to the traveling nut and idlers leading the ropes to the corners of the inner frame for raising same upon revolution of the bar.

4. An automobile hoist comprising an outer rectangular frame embracing a vertically movable frame, means on the outer frame for raising and lowering the movable frame including a transverse frame member, a revolvable screw bar over same and a traveling nut on the bar slidably engaging said frame member, ropes secured to the traveling nut and idlers leading the ropes to the four corners of the inner frame for raising same upon revolution of the bar.

5. An automobile hoist comprising an outer frame embracing a vertically movable frame, means on the outer frame for raising and lowering the movable frame including a transverse frame member, a revolvable screw bar over same and a traveling nut on the bar slidably engaging said frame member, ropes secured to the traveling nut and idlers leading the ropes to the corners of the inner frame for raising same upon revolution of the bar.

JOHN P. DONOVAN.